United States Patent
Chan et al.

(10) Patent No.: US 7,061,203 B2
(45) Date of Patent: Jun. 13, 2006

(54) METHOD AND RELATED APPARATUS FOR CONTROLLING CALIBRATION OF A STEPPING MOTOR

(75) Inventors: Yi-Chung Chan, Taipei Hsien (TW); Jacky Lee, Taipei Hsien (TW); Alex Lin, Taipei Hsien (TW)

(73) Assignee: VIA Technologies Inc., Taipei Hsien (TW)

( * ) Notice: Subject to any disclaimer, the term of this patent is extended or adjusted under 35 U.S.C. 154(b) by 100 days.

(21) Appl. No.: 10/708,765

(22) Filed: Mar. 24, 2004

(65) Prior Publication Data
US 2004/0189236 A1 Sep. 30, 2004

Related U.S. Application Data

(60) Provisional application No. 60/457,880, filed on Mar. 27, 2003.

(30) Foreign Application Priority Data
Feb. 17, 2004 (TW) ............... 93103750 A

(51) Int. Cl.
*G05B 19/40* (2006.01)
(52) U.S. Cl. ............. 318/685; 318/696; 318/138; 318/439
(58) Field of Classification Search ............. 318/138, 318/439, 254, 700, 685, 696
See application file for complete search history.

(56) References Cited

U.S. PATENT DOCUMENTS

| | | | | |
|---|---|---|---|---|
| 3,863,118 A | * | 1/1975 | Lander et al. | 318/685 |
| 4,535,405 A | * | 8/1985 | Hill et al. | 700/90 |
| 4,631,657 A | * | 12/1986 | Hill et al. | 700/63 |
| 4,685,007 A | * | 8/1987 | Nazarian et al. | 360/78.14 |
| 4,761,598 A | * | 8/1988 | Lovrenich | 318/685 |
| 4,949,027 A | * | 8/1990 | Baur | 318/696 |
| 5,977,737 A | * | 11/1999 | Labriola, II | 318/599 |
| 6,911,900 B1 | * | 6/2005 | Deuss et al. | 340/310.1 |

FOREIGN PATENT DOCUMENTS

| | | |
|---|---|---|
| CN | 1059990 C | 12/2000 |
| DE | 4242068 | 6/1994 |

* cited by examiner

*Primary Examiner*—Rina Duda
*Assistant Examiner*—Tyrone Smith
(74) *Attorney, Agent, or Firm*—Winston Hsu

(57) ABSTRACT

A controlled stepping motor is electrically connected to a controller and a loading device. A method of controlling the stepper motor includes utilizing the controller to output a control signal to the stepping motor according to a target displacement and a first index parameter, utilizing the stepping motor to move the loading device according to the control signal, utilizing the controller to calculate a difference between the target displacement and an actual displacement of the loading device, and utilizing the controller to generate a second index parameter for updating the first index parameter according to the first index parameter, the difference, and the actual displacement.

18 Claims, 3 Drawing Sheets

METHOD AND RELATED APPARATUS FOR CONTROLLING CALIBRATION OF A STEPPING MOTOR

CROSS REFERENCE TO RELATED APPLICATIONS

The application claims the benefit of U.S. Provisional Application No. 60/457,880, which was filed on Mar. 27, 2003 and entitled "METHOD FOR CONTROLLING CALIBRATION FOR A STEPPING MOTOR".

BACKGROUND OF INVENTION

1. Field of the Invention

The present invention relates to a method and an apparatus for controlling a stepping motor. In particular, the present invention discloses a method and an apparatus for controlling calibration of a stepping motor.

2. Description of the Prior Art

Because stepping motors are driven by a simple control mechanism, the stepping motors have been applied on many control systems for controlling the velocity, the displacement, and the moving direction of loading devices. The stepping motor has no brush, and a rotor of the stepping motor spins because magnetic fields imposed on poles of a stator are alternatively switched. Therefore, the main difference between the stepping motor and a general motor is that the stepping motor only powered by a fixed driving voltage does not rotate. However, the stepping motor is a mechanical device controlled by digital signals. When a digital pulse signal is inputted into the stepping motor, the rotor of the stepping motor is rotated by a fixed angle, that is, a well-known stepping angle. Because the stepping motor is capable of receiving the digital signals to generate a corresponding angle variation in proportion to the total number of pulses, the stepping motor can be driven by an open loop without utilizing a feedback mechanism. Therefore, the stepping motor can be easily controlled when the stepping motor is driven to achieve a rotational speed within an acceptable range.

In addition, when the stepping motor is powered by an appropriate voltage, a holding torque is induced between the rotor and the stator. Therefore, when a control process of the stepping motor begins, the rotor is capable of resisting an external force for holding its current position if no digital signal is inputted to the stepping motor. Based on different structures and different operating rules of the rotors and stators, the stepping motors, general speaking, are commonly classified into the variable reluctance (VR) type, the permanent magnet (PM) type, and the hybrid type. Because the hybrid type stepping motors have advantages of both the PM type stepping motors and the VR type stepping motors, the hybrid type stepping motors are widely adopted. It is well-known that the PM type stepping motors, the VR type stepping motors, and the hybrid type stepping motors are driven by the same control mechanism.

Because the structures and operating rules of the stepping motors are well-known, lengthy descriptions explaining structures and operating rules are skipped. Please refer to FIG. 1, which is a schematic diagram illustrating a prior art stepping motor control system 10. The stepping motor control system 10 has a user interface (UI) 12, a controller 14, a driving circuit 16, a stepping motor, and a power supply 20. The UI 12 can be positioned at a computer system or a programmable logic controller (PLC). The UI 12 is used for outputting a high-level command 22 to the controller 14. For instance, the stepping motor control system 10 is located inside an optical disk drive for controlling a pick-up head to perform a track seeking operation. Therefore, the UI 12 can directly deliver information associated with the wanted track to the controller 14, and the controller 14 generates a control signal 24 to command the driving circuit 16. For example, the controller 14 outputs step pulses and a direction signal to the driving circuit 16 according to the received track information. Then, the driving circuit 16 outputs an electric current 26 according to the control signal 24 for driving the step motor 18. That is, the current 26 passes the windings surrounded the poles of the stator, and the required magnetic fields are induced to rotate the rotator clockwise or counter-clockwise. Therefore, the stepping motor 18 is capable of moving the pick-up head toward the target track after the UI 12 successfully outputs the track information. In addition, the power needed by the driving circuit 16 for generating the wanted electric current 26 is supplied by the power supply 20.

Generally speaking, the step angle of the stepping motor 18 is determined according to the structure of the stepping motor 18 and the driving mechanism (a full step or a half step for example) adopted by the driving circuit 16. Therefore, the controller 18 can define an index parameter used for determining a relationship between the control signal 24 and the displacement associated with the loading device moved by the stepping motor 18. For instance, regarding the stepping motor control system applied on the optical disk drive, the controller 14 stores an index parameter idxtrk used for defining a ratio between a total number of step pulses idx delivered to the driving circuit 16 and a total number of tracks trk crossed by the pick-up head. That is, idxtrk=idx/trk. Therefore, if the pick-up head wants to move from the current track k to a target track k+m, the required number of step pulses idx is equal to idxtrk*m according to the index parameter idxtrk. Therefore, the stepping motor 18 can move the pick-up head from the initial track k to the desired track k+m finally.

However, while the stepping motor 18 is working, the actual step angle may become unsteady owing to the circuit structure of the stepping motor 18 or other factors, and is deviated from the ideal step angle. That is, when the pick-up head starts the track seeking operation, the arrived track will miss the target track. Consequently, the track seeking operation is repeated to correctly locate the target track. In other words, performance of the optical disk drive is bad owing to the unstable stepping motor 18. Similarly, any control systems using the stepping motor 18 will move the loading device incorrectly owing to the step angle inaccuracy.

SUMMARY OF INVENTION

This invention provides a method and an apparatus for controlling calibration of a stepping motor.

Briefly summarized, one preferred embodiment of the present invention provides a method for controlling a stepping motor. The method includes outputting a control signal to the stepping motor according to a target displacement and a first index parameter, moving a loading device according to the control signal, calculating a difference between the target displacement and an actual displacement of the loading device, and generating a second index parameter according to the first index parameter, the difference, and the actual displacement.

In addition, another preferred embodiment of the present invention provides a controller for controlling a stepping motor. The controller has a controlling device for outputting a control signal corresponding to a target position variation according to a target displacement and a first index parameter, a driving device for driving the stepping motor according to the control signal to move the loading device, a tracing device for tracing an actual position variation associated with the stepping motor or a loading device driven according to the control signal, and a calculating device for generating a second index parameter to replace the first index parameter according to the first index parameter, the target position variation, and the actual position variation when the difference between the target position variation and the actual position variation is greater than a threshold value.

To compare with the prior art, it is an advantage of the present invention that a difference between an actual displacement and a target displacement is used to further tune a currently used index parameter. The index parameter adjusted by the feedback information helps a controller to output an adequate control signal so that the influence caused by the step angle error inherent to the stepping motor is alleviated. Specifically, the present invention provides formulas to prove that the computed index parameter adjusted by the tuning process is convergent. In addition, the computational complexity associated with the adjustment of the index parameter is reduced because of the bit-shifting operations. In other words, the claimed method is easily implemented.

These and other contents of the present invention will no doubt become obvious to those of ordinary skill in the art after reading the following detailed description of the preferred embodiment, which is illustrated in the various figures and drawings.

DETAILED DESCRIPTION

Figure 1:
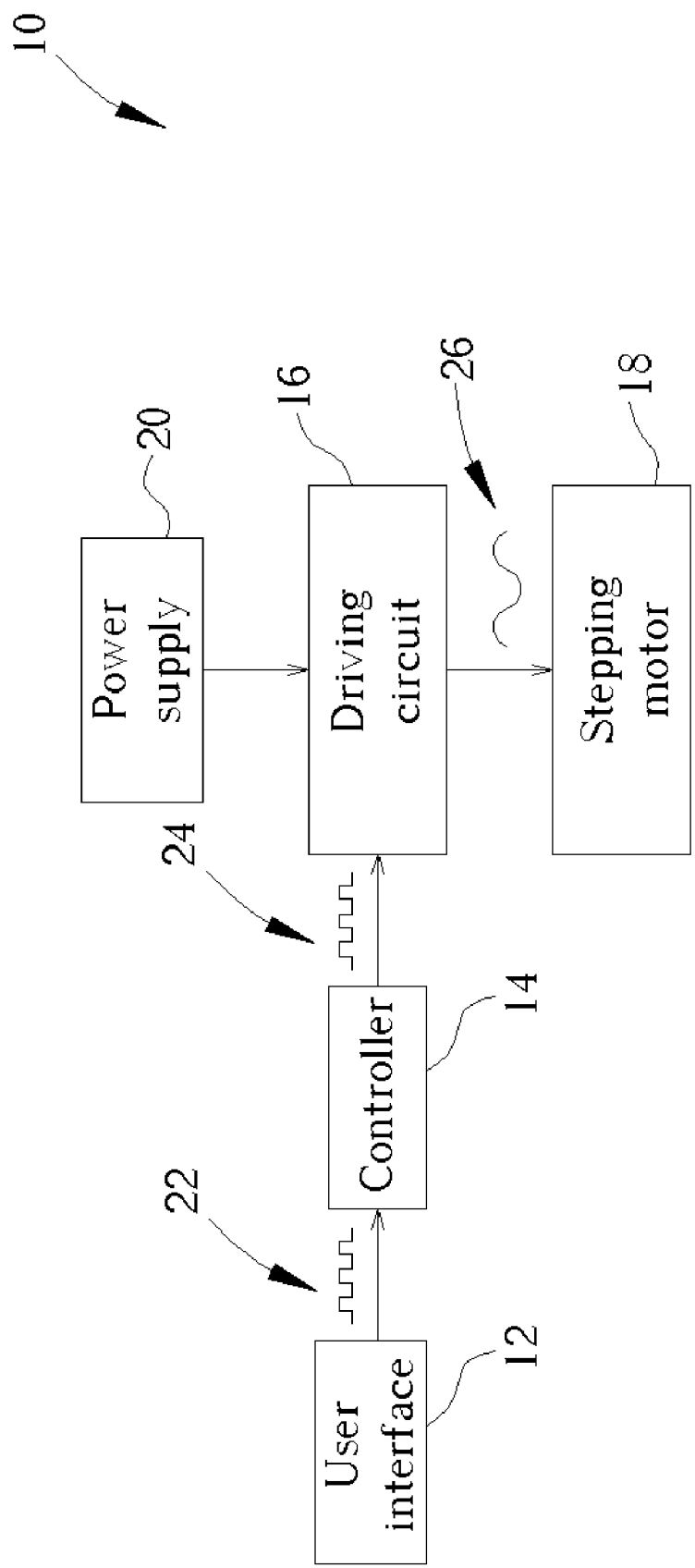
FIG. 1 is a schematic diagram illustrating a prior art stepping motor control system.
Figure 2:
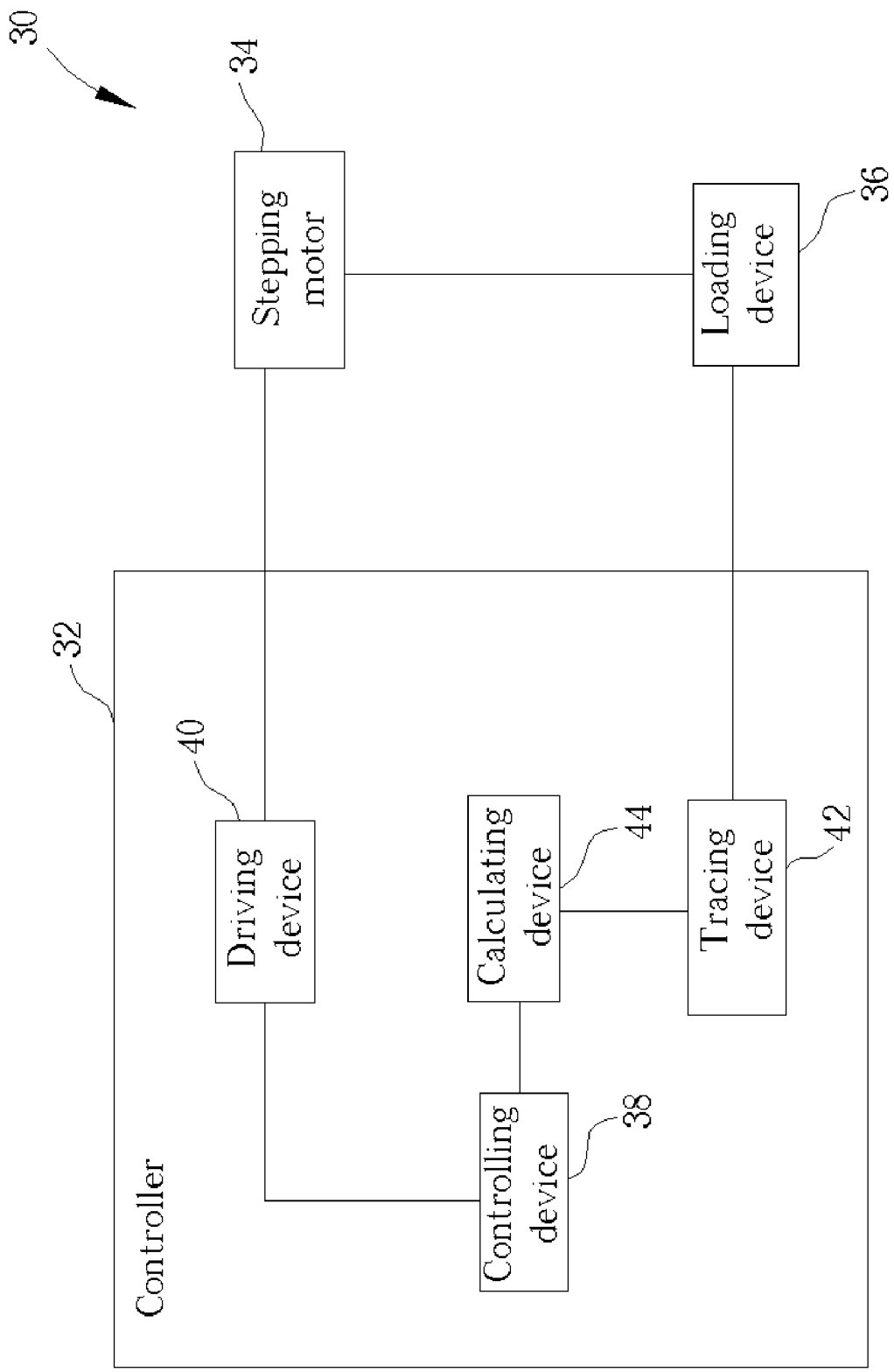
FIG. 2 is a block diagram of a stepping motor control system according to the present invention.

Please refer to FIG. 2, which is a block diagram of a stepping motor control system 30 according to the present invention. The stepping motor control system 30 includes a controller 32, a stepping motor 34, and a loading device 36. The controller 32 is used for controlling operation of the stepping motor 34 so that the stepping motor 34 further moves the corresponding loading device 36. For example, suppose that the stepping motor control system 30 is applied on an optical disk drive, and the loading device 36 is a pick-up head for access an optical disk. However, if the stepping motor control system 30 is applied on a scanner instead, the loading device 36 is the scanning module for scanning a document.

In the preferred embodiment, the controller 32 has a controlling device 38, a driving device 40, a tracing device 42, and a calculating device 44. The controlling device 38 uses an index parameter far outputting a control signal to the driving device 40. The term index parameter represents a number of driving pulses output from the controller 32 to the driving device 40 through the control signal that are required to move the stepping motor a predetermined displacement. Then, with the usage of the stepping motor 34, the driving device 40 moves the loading device 36 by an actual displacement according to a target displacement corresponding to the control signal. The tracing device 42 is used for detecting the actual displacement associated with the loading device 36, and reports the information of the actual displacement to the calculating device 44. In the end, the calculating device 44 determines whether the index parameter currently used by the controlling device 38 needs to be adjusted according to the received information of the actual displacement.

Figure 3:
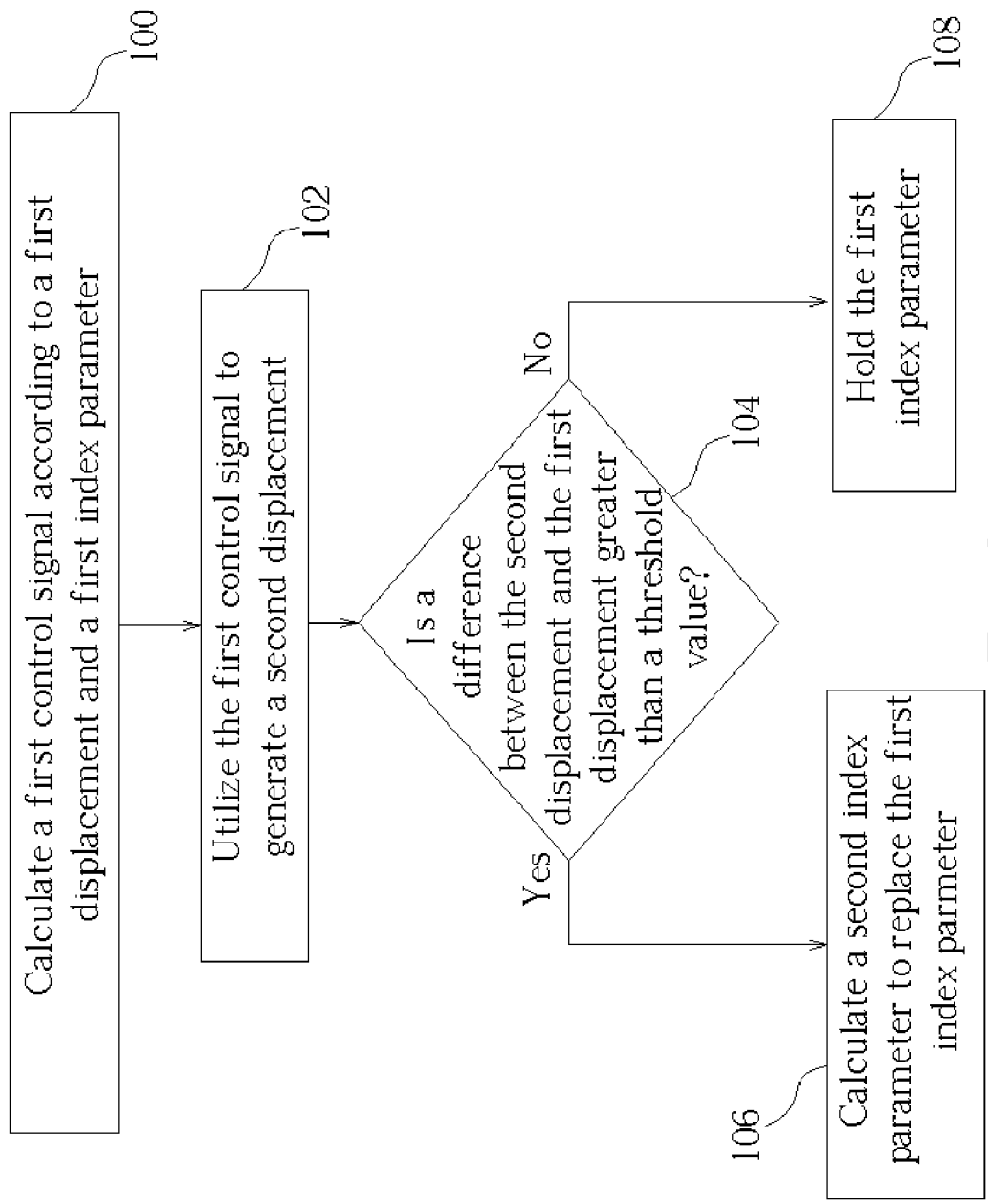
FIG. 3 is a flow chart illustrating the method of controlling calibration of the stepping motor according to the present invention.

Please refer to FIG. 3, which is a flow chart illustrating the method of controlling calibration of the stepping motor 34 according to the present invention. The method according to the present invention could be applied on the stepping motor control system 30 shown in FIG. 2. Therefore, the operations associated with the components within the stepping motor control system 30 are not repeated. The method of controlling calibration of the stepping motor 34 includes following steps.

Step 100: The controlling device 38 calculates a first control signal required to make the loading device 36 have a first displacement according to a first index parameter and the first displacement.

Step 102: The controlling device 34 outputs the first control signal to command the stepping motor 34 so that the loading device 36 is moved to have a second displacement.

Step 104: The calculating device 44 calculates a difference between the first displacement and the second displacement. Determine if the difference is greater than a threshold value. If yes, go to step 106; otherwise, go to step 108.

Step 106: The calculating device 44 calculates a second index parameter to replace the first index parameter, wherein a difference between the first displacement and a third displacement corresponding to the first control signal referring to the second index parameter is not greater than the threshold value.

Step 108: The controlling device 38 holds the currently used first index parameter.

The above flow is described as follows. With regard to an optical disk drive, a control chip of the optical disk drive or an application program run on a computer host determines that a pick-up head of the optical disk drive has to move from the current track k to the target track k+m for accessing data stored on the track k+m. That is, the pick-up head needs to have a first displacement striding across m tracks. Referring to a first index parameter idxtrk[K] currently adopted by the controlling device 38, the controlling device 38 calculates the desired number of step pulses idx (the first control signal) when the stepping motor 34 needs to make the pick-up head move across m tracks, that is, the first displacement (step 100).

However, while the stepping motor 34 is working, the step angle, as mentioned above, is usually not equal to the ideal value. Therefore, when the controlling device 38 utilizes the calculated first control signal to drive the stepping motor 34, the stepping motor 34 actually moves the pick-up head from the track k to the track k+n. That is, the pick-up head actually has a second displacement across n tracks (step 102). Please note that when the pick-up head performs the track seeking operation, it reads track information at the same time. Therefore, the tracing device 42 is capable of acknowledging the second displacement of the pick-up head after the first control signal is applied. In the preferred embodiment, the calculating device 44 compares the first displacement with the second displacement for computing a difference, and determines whether the first index parameter needs to be adjusted according to a comparison between the difference and a threshold value (step 104).

It is well-known that the track seeking operation is influenced by many factors besides the stepping motor 38 itself. For instance, the track on the optical disk is not a perfect circle, but is positioned on the optical disk spirally. Therefore, a disk eccentricity, that is, a disk run-out also affects the track seeking operation. Because the preferred embodiment mainly calibrates the stepping motor 34 with an unsteady step angle, other factors having nothing to do with the stepping motor 34 need to be excluded. In addition, the stepping motor 34 drives the pick-up head to perform the track seeking operation through an open loop. Therefore, if the actual track k+n is close to the target track k+m, this track seeking operation is regarded as a successful one. Then, the optical disk drive activates a well-known track locking operation through a close loop for driving the pick-up head to lock the target track k+m. In other words, if the difference between the first displacement and the second displacement is not greater than the threshold value, it means that the controlling device 34 can adopt the first index parameter to successfully complete the track seeking operation. Therefore, when a following track seeking operation is performed, the controlling device 34 still utilizes the first index parameter to compute the needed control signal (step 108).

On the contrary, if the difference between the first displacement and the second displacement is greater than the threshold value, it means that the stepping motor 34 along with other factors such as the disk eccentricity make the track k+n greatly deviated from the target track k+m so that the first index parameter is no longer suitable for the stepping motor 34 to make the actual track k+n close to the target track k+m. Therefore, the calculating device 44 has to compute an adequate second index parameter to modify the ratio between the control signal corresponding to the total number of step pulses idx and the displacement corresponding to the total number of tracks trk (step 106). That is, a difference between the first displacement and a third displacement corresponding to the first control signal referring to the second index parameter is not greater than the threshold value.

In the preferred embodiment, the second index parameter is generated from adjusting the first index parameter, and the computation is described as follows.

idxtrk″=idxtrk′+ΔI        Equation (1)

trk=idx/idxtrk′        Equation (2)

trk+Δtrk=idx/(idxtrk′+ΔI)        Equation (3)

For the equation (1), idxtrk stands for the index parameter currently used by the controlling device 38, and idxtrk″ stands for the adjusted index parameter. In addition,

I is a compensation value. For the equation (2), the index parameter idxtrk is equal to a total number of step pulses idx (the control signal) divided by a total number of tracks trk (the displacement). Concerning the equation (3), the controlling device 38 drives the stepping motor 34 according to the total number of step pulses idx, and the total number of tracks crossed by the pick-up head equals trk+

trk. That is, when the index parameter idxtrk is modified to be idxtrk″″, the index parameter idxtrk″″ is equal to the total number of step pulses idx divided by the total number of tracks trk+

trk according to the index parameter idxtrk defined in the equation (2). Please note that

trk represents a difference between a target displacement and an actual displacement. If the total number of tracks corresponding to the total number of step pulses idx is greater than the target number of tracks trk, the actual total number of tracks is equal to trk+

trk. However, if the total number of tracks corresponding to the total number of step pulses idx is less than the target number of tracks trk, the actual total number of tracks is equal to trk−

trk.

The compensation value

I is calculated through the equation (1) and the equation (2), and is equal to ±idxtrk″*[

trk/(trk±

trk)]. Therefore, if the target displacement is greater than the actual displacement, the compensation value

I is a negative value, and the index parameter idxtrk"" is surely less than the index parameter idxtrk. On the contrary, if the target displacement is less than the actual displacement, the compensation value

I is a positive value, and the index parameter idxtrk"" is surely greater than the index parameter idxtrk". Considering a threshold value TH, the computation for the compensation value

I is further modified as follows:

$$\Delta i = \pm idxtrk'' * \{(\Delta trk - TH)/[trk \pm (\Delta trk - TH)]\} \quad \text{Equation (4)}$$

In the preferred embodiment, the calculating device 44 can be a digital signal processor (DSP) used for computing and adjusting the index parameter. Because the interval between two adjacent tracks is small, the index parameter, generally speaking, is a fraction. For example, when the total number of step pulses idx is equal to 10, and is used to drive the stepping motor 18, the corresponding total number of tracks trk is equal to 200. Therefore, the index parameter is 10/200. Suppose that the DSP utilized a fixed-point architecture.

When the calculating device 44 in the preferred embodiment computes the compensation value

I, that is, $\pm idxtrk'' * \{$

$trk/[trk\pm$

$trk]\}$, the calculating device 44 uses an adjustment value ($2^{15}$ for example) to adjust fixed-point values of the index parameter idxtrk and the compensation value

I. For instance, suppose that the DSP utilizes an 8-bit fixed-point architecture. Therefore, the most significant bit of a register is a sign bit, and the following 7 bits correspond to $2^3$–$2^{-3}$ sequentially. That is, the maximum binary value recorded by the register is represented by 01111.111, and the minimum binary value recorded by the register is represented by 11111.111.

It is obvious that the register does not have sufficient bits for recording the fraction portion. If the DSP directly calculates the index parameter, storing the fraction portion of the calculation result in the register leads to a rounding error or a truncation error. Therefore, after many calculations for calibrating the index parameter are completed, the rounding error or the truncation error seriously influences the precision of the calculation result. However, if the bits within the register originally used to store the integer portion are utilized to assist in keeping the fraction portion, the available bits of the fraction portion are increased. For example, suppose that the DSP is a 32-bit fixed-point architecture, and a value $2^{15}$ is used to be the wanted adjustment value. When computing the compensation value

I, the calculating device 44 shifts 15 bits left first, and then the formula $\pm idxtrk'' * \{($

$trk - TH)/[trk \pm ($

$trk - TH)]\}$ is computed. In the preferred embodiment, the precision of the computed compensation value

I is improved because of the left bit-shifting operation. It is obvious that the calculating device 44 actually processes the equation: IDXTRK""=IDXTRK"+

I, wherein IDXTRK"" corresponds to $2^{15}*idxtrk''''$, IDXTRK corresponds to $2^{15}*idxtrk$, and

I corresponds to $2^{15}*$ i. Please note that the adjustment value can be set to various values according to the used N-bit fixed-point architecture.

The tuning process of the index parameter is illustrated through the following example. Suppose that the threshold value adopted by the calculating device 44 equals 200, and the adjustment value adopted by the calculating device 44 equals $2^{15}$. In addition, an initial value of the index parameter IDXTRK stored in the controlling device 38 is equal to 2586. That is, before the optical disk drive starts accessing data stored on the optical disk, the index parameter currently used by the controlling device 38 is equal to 2586. Considering the pick-up head that jumps a long range (40000 tracks for example), the compensation value

I( 

I=$2^{15}$* i) is expressed as follows:

$$\Delta I = \pm IDXTRK * \{(\Delta trk - TH)/[trk \pm (\Delta trk - TH)]\}$$
$$= \pm 2586 * \{(\Delta trk - 200)/[40000 \pm (\Delta trk - 200)]\} \quad \text{Equation (5)}$$

Because 40000 is far greater than ($\Delta trk - 200$), the above equation (5) is rewritten as follows:

$$\Delta I = \pm 2586 * [(\Delta trk - 200)/40000] = \pm (\Delta trk - 200)/15.4663 = \pm \text{gain} * [(\Delta trk - 200)] \quad \text{Equation (6)}$$

Therefore, when the tuning process of the index parameter IDXTRK begins, the gain value expressed in equation (6) needs to be less than 1/15.4663.

On the other hand, considering the pick-up head then jumps a short range (1024 tracks for example), the compensation value I now is expressed as follows:

$$\Delta I = \pm IDXTRK * \{(\Delta trk - TH)/[trk \pm (\Delta trk - TH)]\}$$
$$= \pm 2586 * \{(\Delta trk - 200)/[1024 \pm (\Delta trk - 200)]\} \quad \text{Equation (7)}$$

The track error equaling 200 is not reasonable if the pick-up head only moves across 1024 tracks. Therefore, the threshold value (200) is not taken into consideration when the pick-up head performs a short jump. The equation (7) is modified as follows:

$$\Delta I = \pm 2586 * [\Delta trk/(1024 \pm \Delta trk)] \quad \text{Equation (8)}$$

Because 1024 is far greater than $\Delta trk$, the equation (8) is further rewritten as follows:

$$\Delta I = \pm 2586 * (\Delta trk/1024) = \pm \Delta trk/2.526 = \pm \text{gain} * (\Delta trk) \quad \text{Equation (9)}$$

Therefore, when the tuning process of the index parameter IDXTRK begins, the gain value expressed in equation (6) needs to be less than 1/2.526. Simultaneously considering the inequalities of the gain values associated with the long jump (4000 tracks) and the short jump (1024 tracks), the intersection of these two inequalities is the gain value being less than 1/15.4663. That is, suppose that the tuning process of the index parameter starts, and a value less than 1/15.4663 is used to be the gain value for computing the compensation value

I. When the controlling device 38 uses the index parameter obtained from the tuning process to determine the total number of step pulses idx corresponding to the total number of tracks trk, and outputs the total number of step pulses idx for commanding the stepping motor 34 to move the pick-up head by a displacement corresponding to a predetermined number of tracks, the difference between the target displacement and the actual displacement is certainly to be less than the threshold value. In other words, the difference is converged within the range defined by the threshold value, and the goal of tuning the index parameter is successfully achieved.

When the calculating device 44 adjusts the index parameter IDXTRK to obtain the index parameter IDXTRK'''', the calculating device 44 utilizes this equation:

I=±gain*( 

trk−TH) to compute the compensation value

I, wherein the gain value can be any values less than 1/15.4663. In order to quicken the calculation, the calculating device 44 in the preferred embodiment adopts 1/16 to be the gain value. The reason is that 16 is equal to $2^4$, which is greater than 15.4663 and is a value closest to 15.4663 among values represented by $2^n$. Therefore, a right bit-shifting operation is utilized to quickly compute ±gain*(

trk−TH). As mentioned above, the equation associated with the calculation of the index parameter IDXTRK'''' can be expressed as follows:

$$IDXTRK'''' = IDXTRK'' \pm gain * ( \triangle$$

trk−TH)  Equation (10)

In the equation (10), the gain value corresponds to $\frac{1}{2^R}$. Therefore, the result of ( $\triangle$ trk−TH) is shifted R bits right to rapidly compute the compensation value $\triangle$ I, and the computation efficiency of the tuning process is improved. Please note that in the preferred embodiment, the claimed method of controlling calibration of the stepping motor is applied on an optical disk drive. However, the claimed method can be applied on any apparatuses using the stepping motor control system. For example, a scanner has a scanning module, and the scanning module is moved by a stepping motor for scanning a document.

In contrast to the prior art, the claimed method of controlling calibration of the stepping motor is capable of modifying a mapping relation between a control signal outputted from a controller and a displacement of a loading device driven by a stepping motor. When the controller wants the loading device to move according to a target displacement, the controller can use the tuned mapping relation to determine the needed control signal corresponding to the target displacement. If an actual displacement is still greater than the target displacement, the controller will continuously adjust the mapping relation until a difference between the actual displacement and the target displacement is less than a threshold value. To sum up, the claimed method is capable of helping the stepping motor to precisely move the loading device toward a target position, and the performance of the stepping motor is greatly improved.

What is claimed is:

1. A method for controlling a stepping motor, the stepping motor being connected to a controller and a loading device, the method comprising:

utilizing the controller for outputting a control signal to the stepping motor according to a target displacement and a first index parameter, utilizing the stepping motor to move the loading device according to the control signal;

utilizing the controller for calculating a difference between the target displacement and an actual displacement of the loading device; and utilizing the controller for generating a second index parameter according to the first index parameter, the difference, and the actual displacement, wherein the first and second index parameters each represent a number of driving pulses output from the controller to the stepping motor through the control signal that are required to move the stepping motor a predetermined displacement, and generating the second index parameter comprises:

when the actual displacement is greater than the target displacement, utilizing the controller for calculating a deviation value between the difference and a threshold value, utilizing the controller for calculating a modified displacement by subtracting the target displacement from the deviation value, and utilizing the controller for subtracting a compensation value from the first index parameter to generate the second index parameter wherein the compensation value is calculated from a product of the deviation value and the first index parameter divided by the modified displacement.

2. The method of claim 1 further comprising utilizing the controller to compare the difference and a threshold value, wherein if the difference is greater than the threshold value, the second index parameter is utilized to update the first index parameter.

3. The method of claim 1 further comprising utilizing the controller to compare the difference and a threshold value, wherein if the difference is not greater than the threshold value, the first index parameter is held.

4. The method of claim 1 wherein the stepping motor is applied to an optical disk drive, and the loading device is a pick-up head of the optical disk drive.

5. The method of claim 4 wherein the stepping motor moves the pick-up head to generate the actual displacement for driving the pick-up head to locate a predetermined track on an optical disk.

6. The method of claim 4 being performed while the optical disk drive activates a track seeking operation for the optical disk.

7. The method of claim 1 wherein the controller comprises a digital signal processor (DSP) for calculating the second index parameter.

8. The method of claim 7 wherein the DSP utilizes $2^R$ for representing a calculation result of the modified displacement divided by the first index parameter, R being an integer.

9. The method of claim 8 wherein the DSP shifts R bits right to divide the deviation value by the calculation result.

10. The method of claim 2 wherein the threshold value is programmable.

11. The method of claim 1 wherein the stepping motor is applied to a scanner, and the loading device is a scanning module of the scanner.

12. The method of claim 1 wherein the step of generating the second index parameter further comprises:

if the actual displacement is not greater than the target displacement, utilizing the controller for calculating a deviation value between the difference and the threshold value, utilizing the controller for calculating a modified displacement by adding the target displacement to the deviation value, and utilizing the controller for adding a compensation value to the first index parameter to generate the second index parameter wherein the compensation value is calculated from a product of the deviation value and the first index parameter divided by the modified displacement.

13. A controller for controlling a stepping motor, the stepping motor being connected to the controller and a loading device, the controller comprising:

a controlling device for outputting a control signal corresponding to a target position variation according to a target displacement and a first index parameter, a driving device for driving the stepping motor according to the control signal to move the loading device;

a tracing device for tracing an actual position variation associated with the stepping motor or the loading device driven according to the control signal; and a calculating device for generating a second index parameter to replace the first index parameter according to the first index parameter, the target position variation, and the actual position variation when the difference between the target position variation and the actual position variation is greater than a threshold value, wherein the first and second index parameters each represent a number of driving pulses output from the controller to the stepping motor through the control signal that are required to move the stepping motor a predetermined displacement, and the calculating device subtracts the target position variation from the deviation value to generate a modified position variation, calculates a compensation value from a product of the deviation value and the first index parameter divided by the modified position variation, and subtracts the compensation value from the first index parameter to generate the second index parameter when the actual position variation is greater than the target position variation.

14. The controller of claim 13 wherein the calculating device calculates a deviation value between the difference and the threshold value.

15. The controller of claim 13 wherein the calculating device comprises a digital signal processor (DSP) for calculating the second index parameter.

16. The controller of claim 15 wherein the DSP utilizes $2^R$ for representing a calculation result of the modified position variation divided by the first index parameter, R being an integer.

17. The controller of claim 16 wherein the DSP shifts R bits right to divide the deviation value by the calculation result.

18. The controller of claim 13 wherein the calculating device calculates a deviation value between the difference and the threshold; the calculating device adds the target position variation to the deviation value to generate a modified position variation, calculates a compensation value from a product of the deviation value and the first index parameter divided by the modified position variation, and adds the compensation value to the first index parameter to generate the second index parameter when the actual position variation is not greater than the target position variation.

* * * * *